United States Patent
Hayakawa et al.

(10) Patent No.: US 12,012,349 B2
(45) Date of Patent: Jun. 18, 2024

(54) GLASS FINE PARTICLE DEPOSIT AND METHOD FOR MANUFACTURING GLASS PREFORM

(71) Applicant: SUMITOMO ELECTRIC INDUSTRIES, LTD., Osaka (JP)

(72) Inventors: Masatoshi Hayakawa, Osaka (JP); Masumi Ito, Osaka (JP); Tatsuya Konishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 211 days.

(21) Appl. No.: 17/600,648

(22) PCT Filed: Mar. 30, 2020

(86) PCT No.: PCT/JP2020/014629
§ 371 (c)(1),
(2) Date: Oct. 1, 2021

(87) PCT Pub. No.: WO2020/203985
PCT Pub. Date: Oct. 8, 2020

(65) Prior Publication Data
US 2022/0162111 A1    May 26, 2022

(30) Foreign Application Priority Data
Apr. 3, 2019   (JP) ................... 2019-071333

(51) Int. Cl.
*C03B 37/018*   (2006.01)
(52) U.S. Cl.
CPC ........ *C03B 37/018* (2013.01); *C03B 2207/70* (2013.01)

(58) Field of Classification Search
None
See application file for complete search history.

(56) References Cited

U.S. PATENT DOCUMENTS

| 8,390,803 B2 * | 3/2013 | Iida ................. G01J 3/0272 356/243.1 |
| 2015/0166399 A1 | 6/2015 | Ishihara et al. |

(Continued)

FOREIGN PATENT DOCUMENTS

| CN | 108947212 A | 12/2018 |
| CN | 108996896 A | 12/2018 |

(Continued)

*Primary Examiner* — Lisa L Herring
(74) *Attorney, Agent, or Firm* — Faegre Drinker Biddle & Reath LLP

(57) ABSTRACT

Provided is a glass fine particle deposit in which a pH of glass fine particles on a surface of the glass fine particle deposit is 5.5 or more and less than 8.5, in which a color difference ΔE*ab with respect to a white calibration plate when the surface of the glass fine particle deposit is measured by the SCI method using a spectrophotometer is 0.5 or more and less than 5. Provided is a method for manufacturing a glass preform including: manufacturing a transparent glass preform by heating a glass fine particle deposit in which a pH of glass fine particles on a surface of the glass fine particle deposit is 5.5 or more and less than 8.5; and measuring the surface of the deposit by the SCI method using a spectrophotometer and determining whether a color difference ΔE*ab with respect to a white calibration plate is 5 or more.

5 Claims, 2 Drawing Sheets

(56) References Cited

U.S. PATENT DOCUMENTS

2021/0122664 A1    4/2021   Hayakawa et al.
2022/0033294 A1*   2/2022   Hayakawa ........ C03B 37/01807

FOREIGN PATENT DOCUMENTS

| JP | 2004-338992 A | 12/2004 | |
|----|---------------|---------|---|
| JP | 2015-113259 A | 6/2015 | |
| JP | 2018-193279 A | 12/2018 | |
| JP | 2018-203576 A | 12/2018 | |
| WO | WO-2019-225637 A1 | 11/2019 | |
| WO | WO-2020054861 A1 * | 3/2020 | ....... C03B 37/01807 |

* cited by examiner

GLASS FINE PARTICLE DEPOSIT AND METHOD FOR MANUFACTURING GLASS PREFORM

TECHNICAL FIELD

The present disclosure relates to a glass fine particle deposit and a method for manufacturing a glass preform.

The present application claims priority from Japanese Patent Application No. 2019-71333 filed on Apr. 3, 2019, contents of which are incorporated by reference in its entirety.

BACKGROUND ART

Patent Literature 1 describes a method for manufacturing a glass preform, which includes a transparentizing step of manufacturing a glass fine particle deposit using a siloxane as a raw material for glass synthesis and heating the manufactured glass fine particle deposit to manufacture a transparent glass preform.

CITATION LIST

Patent Literature

Patent Literature 1: JP-A-2015-113259

SUMMARY OF INVENTION

A glass fine particle deposit according to the present disclosure is a glass fine particle deposit in which a pH of glass fine particles on a surface of the glass fine particle deposit is 5.5 or more and less than 8.5, in which a color difference ΔE*ab with respect to a white calibration plate when the surface of the glass fine particle deposit is measured by the Specular Component Include (SCI) method using a spectrophotometer is 0.5 or more and less than 5.

A method for manufacturing a glass preform according to the present disclosure is a method for manufacturing a glass preform, the method including:

a transparentizing step of manufacturing a transparent glass preform by heating a glass fine particle deposit in which a pH of glass fine particles on a surface of the glass fine particle deposit is 5.5 or more and less than 8.5; and a determination step of measuring the surface of the deposit by the SCI method using a spectrophotometer and determining whether a color difference ΔE*ab with respect to a white calibration plate is 5 or more, in which in a case where the color difference ΔE*ab is 5 or more, the deposit is heated in an atmosphere having an oxygen content of 10 vol % or more at a temperature lower than that of the transparentizing step (hereinafter, also referred to as an "oxidation heating step"), and then the transparentizing step is performed, and in a case where the color difference ΔE*ab is less than 5, the transparentizing step is performed without heating the deposit in the oxygen-containing atmosphere.

DESCRIPTION OF EMBODIMENTS

Figure 1:
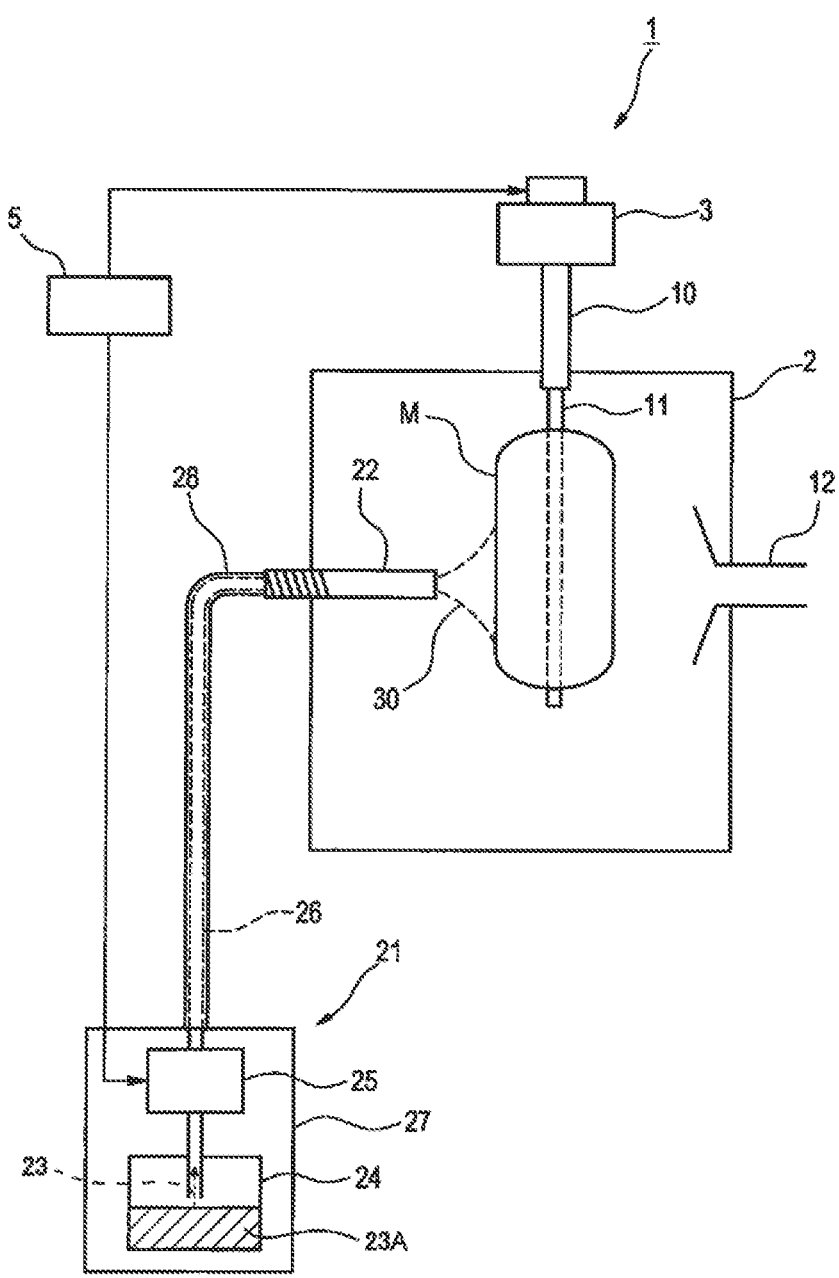
FIG. 1 is a configuration diagram showing an embodiment of an apparatus for manufacturing a glass fine particle deposit according to an aspect of the present disclosure.

Problems to be Solved by the Present Disclosure

In a case where a glass fine particle deposit is manufactured by using siloxane as a raw material for glass synthesis by the method as described in Patent Literature 1, some of the deposited glass fine particles sometimes appeared to be blackened. In a case of manufacturing a transparent glass preform by heating and consolidating the glass fine particle deposit containing the glass fine particles appeared to be blackened (hereinafter, also referred to as "black glass fine particles"), voids are sometimes generated in the obtained glass preform. The presence of the voids in the glass preform manufactured for optical fibers leads into breakage of the wire in a drawing step performed thereafter or formation of a cavity in the optical fiber. Therefore, the portion in which voids are generated is discarded, which reduces the yield.

Since silicon dioxide ($SiO_2$) as the main component of the glass fine particles is white, when the $SiO_2$ has a purity of 100%, the glass fine particles will also be white. Meanwhile, silicon monoxide (SiO) is brown or black. Accordingly, in a case where siloxane is used as the glass raw material, the produced glass fine particles appear to be blackened presumably due to inclusion of secondary produced insufficiently oxidized silicon oxide ($SiO_x$, $X<2$). Here, in the glass fine particle deposit which appear to be blackened, only specific glass fine particles do not appear to be blackened and the specific glass fine particles which appear to be blackened are not mixed with the white glass fine particles. Rather, since silicon oxide which is insufficiently oxidized is contained, it is considered that all of the glass fine particles appear to be blackened although there are shades of color. Accordingly, the generation of the voids in the glass preform obtained by heating and consolidating the deposit containing the black glass fine particles is considered to be due to the inclusion of the insufficiently oxidized silicon oxide.

Here, the glass fine particles contained in the glass fine particle deposit prepared by using siloxane as a glass raw material are not necessarily entirely blackened, and some of the glass fine particles are not blackened at all, or blackened to a very small extent even if it is blackened. In the deposit containing such glass fine particles, almost no voids were generated in the obtained glass preform even when the subsequent transparentizing step is performed directly to the deposit.

The present disclosure provides a glass fine particle deposit in which, in a case where siloxane is used as a raw material for glass synthesis, voids are less likely to be generated in a glass preform to be obtained even when a later transparentizing step is performed.

Further, the present disclosure provides a method for manufacturing a glass preform in which voids are less likely to be generated in a glass preform obtained in a later step even in a case where a glass fine particle deposit is manufactured using siloxane as a raw material for glass synthesis.

[Effects of the Present Disclosure]

According to the present disclosure, even in a case where a glass fine particle deposit is manufactured using siloxane as a raw material for glass synthesis, it is possible to manufacture a glass preform with less voids.

DESCRIPTION OF EMBODIMENTS OF THE PRESENT DISCLOSURE

First, the contents of embodiments of the present disclosure will be listed and described.

A glass fine particle deposit according to an aspect of the present disclosure is (1) a glass fine particle deposit in which a pH of glass fine particles on a surface of the glass fine particle deposit is 5.5 or more and less than 8.5, in which a color difference $\Delta E^*ab$ with respect to a white calibration plate when the surface of the glass fine particle deposit is measured by the SCI method using a spectrophotometer is 0.5 or more and less than 5.

According to this configuration, it is possible to reduce voids generated in a glass preform to be obtained even when a later transparentizing step is performed directly to the glass fine particle deposit.

Here, the "pH of glass fine particles on a surface" means a "pH of a filtrate obtained by weighing 1 g of glass fine particles on the surface, stirring the glass fine particles with 10 ml of water for 1 hour, and then performing filtering thereto".

(2) It is preferable that the color difference $\Delta E^*ab$ is 3 or less.

According to this configuration, it is possible to further reduce voids generated in the obtained glass preform.

A method for manufacturing a glass preform according to an aspect of the present disclosure is (3) a method for manufacturing a glass preform, the method including:

a transparentizing step of manufacturing a transparent glass preform by heating a glass fine particle deposit in which a pH of glass fine particles on a surface of the glass fine particle deposit is 5.5 or more and less than 8.5; and a determination step of measuring the surface of the deposit by the SCI method using a spectrophotometer and determining whether a color difference $\Delta E^*ab$ with respect to a white calibration plate is 5 or more, in which in a case where the color difference $\Delta E^*ab$ is 5 or more, the deposit is heated in an atmosphere having an oxygen content of 10 vol % or more at a temperature lower than that of the transparentizing step, and then the transparentizing step is performed, and in a case where the color difference $\Delta E^*ab$ is less than 5, the transparentizing step is performed without heating the deposit in the oxygen-containing atmosphere.

According to this configuration, in a case where the color difference $\Delta E^*ab$ is 5 or more, heating is performed in the oxygen-containing atmosphere so that silicon oxide which is insufficiently oxidized can be oxidized into silicon dioxide, and thus a glass preform with less voids can be efficiently manufactured.

(4) It is preferable that a heating temperature in the oxygen-containing atmosphere is in a range of 500° C. or higher and 1100° C. or lower.

According to this configuration, the glass fine particles having a color difference $\Delta E^*ab$ of 5 or more can be made to have a color difference $\Delta E^*ab$ of less than 5 within an appropriate time, and thus a glass preform with less voids can be more efficiently manufactured.

(5) It is preferable that a heating time in the oxygen-containing atmosphere is in a range of 1 hour or more and 8 hours or less.

According to this configuration, the glass fine particles having a color difference $\Delta E^*ab$ of 5 or more can be made to have a color difference $\Delta E^*ab$ of less than 5 at an appropriate heating amount, and thus a glass preform with less voids can be more efficiently manufactured.

(6) It is preferable that an oxygen content in the oxygen-containing atmosphere is in a range of 20 vol % or more and 100 vol % or less.

According to this configuration, the glass fine particles having a color difference $\Delta E^*ab$ of 5 or more can be made to have a color difference $\Delta E^*ab$ of less than 5 at an appropriate heating amount within an appropriate time, and thus a glass preform with less voids can be more efficiently manufactured.

(7) It is preferable that the oxygen-containing atmosphere is an air atmosphere.

According to this configuration, oxygen concentration adjustment equipment, heavy fireproof or explosion proof equipment, and the like are not required, and implementation with simple equipment is possible.

Details of Embodiments of the Present Disclosure (Overview of Apparatus Used and Others)

Hereinafter, an example of an embodiment of a glass fine particle deposit and a method for manufacturing a glass preform according to an embodiment of the present disclosure will be described with reference to the accompanying drawings.

FIG. 1 is a configuration diagram of an apparatus 1 (hereinafter, also referred to as "glass fine particle deposit manufacturing apparatus" or "deposit manufacturing apparatus") for manufacturing a glass fine particle deposit of the present embodiment. The deposit manufacturing apparatus 1 includes a furnace 2, a lifting and lowering and rotating device 3, a raw material supply device 21, a burner 22 for producing glass fine particles, and a control unit 5 that controls the operation of each member.

The furnace 2 is a container by which a glass fine particle deposit M is formed. The furnace 2 includes a discharge pipe 12 attached to a side surface of the container.

The lifting and lowering and rotating device 3 is a device for rotating and also lifting and lowering the glass fine particle deposit M with a support rod 10 and a starting rod 11. The lifting and lowering and rotating device 3 lifts and lowers and also rotates the glass fine particle deposit M based on a control signal transmitted from the control unit 5.

The support rod 10 is disposed by being inserted through a through hole formed in an upper wall of the furnace 2. The starting rod 11 is attached to one end (lower end in FIG. 1) of the support rod 10 disposed in the furnace 2. The other end (upper end in FIG. 1) of the support rod 10 is held by the lifting and lowering and rotating device 3.

The starting rod 11 is a rod on which glass fine particles are deposited. The starting rod 11 is attached to the support rod 10.

The discharge pipe 12 is a pipe for discharging the glass fine particles, which have not attached to the starting rod 11 and the glass fine particle deposit M, to the outside of the furnace 2.

A raw material gas 23 vaporized in the raw material supply device 21 is supplied to the burner 22. Here, in FIG. 1, a gas supply device for supplying a flame forming gas is not shown.

The raw material supply device 21 includes a vaporization container 24 that vaporizes a liquid raw material 23A, a mass flow controller (MFC) 25 that controls the gas flow rate of the raw material gas 23, a supply pipe 26 that guides the raw material gas 23 to the burner 22, and a temperature control booth 27 that partially controls the temperature of the vaporization container 24, the MFC 25, and the supply pipe 26. The liquid raw material 23A is siloxane.

The MFC 25 is a device that supplies the raw material gas 23, which is to be emitted from the burner 22, to the burner 22 through the supply pipe 26. The MFC 25 controls a supply amount of the raw material gas 23 to be supplied to the burner 22 based on a control signal transmitted from the control unit 5.

The supply pipe 26 is a pipe that guides the raw material gas 23 to the burner 22. In order to maintain the supply pipe 26 at a high temperature, it is preferable that a tape heater 28, which is a heating element, is wrapped around an outer periphery of the supply pipe 26 and a portion of an outer periphery of the burner 22. The tape heater 28 is energized to heat the supply pipe 26 and the burner 22 so that the temperature of the raw material gas 23 emitted from the burner 22 can be raised to a temperature at which the vaporized raw material gas is not condensed. For example, when the liquid raw material 23A is octamethylcyclotetrasiloxane (OMCTS), the temperature may be raised to a temperature of 175° C. or higher and 200° C. or lower which is higher than the standard boiling point of 175° C. of OMCTS.

The burner 22 oxidizes the raw material gas 23 in the flame to produce glass fine particles 30, and the produced glass fine particles 30 are sprayed onto the starting rod 11 to be deposited. For the burner 22 for ejecting the glass raw material and the flame forming gas, a cylindrical multi-nozzle structure or a linear multi-nozzle structure is used, for example.

The control unit 5 controls each operation of the lifting and lowering and rotating device 3, the raw material supply device 21, and the like. The control unit 5 transmits, to the lifting and lowering and rotating device 3, a control signal for controlling the lifting and lowering speed and the rotating speed of the glass fine particle deposit M. Further, the control unit 5 transmits, to the MFC 25 of the raw material supply device 21, a control signal for controlling the flow rate of the raw material gas 23 emitted from the burner 22.

Figure 2:
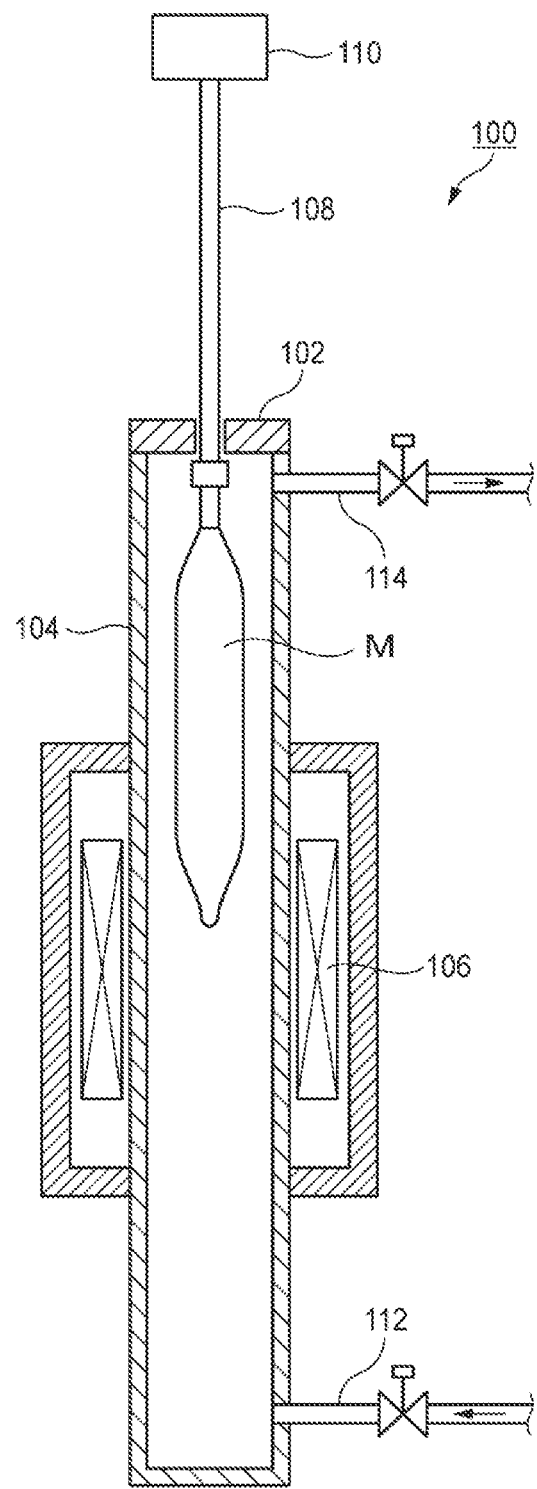
FIG. 2 is a configuration diagram showing an embodiment of an apparatus for performing an oxidation heating step and a transparentizing step of a method for manufacturing a glass preform according to an aspect of the present disclosure.

FIG. 2 is a configuration diagram of an apparatus 100 (hereinafter, also referred to as "heating and consolidating apparatus") that performs a step of heating a glass fine particle deposit M prepared in the depositing step in an oxygen-containing atmosphere (oxidation heating step), and a transparentizing step, in a method for manufacturing a glass preform of the present embodiment.

The heating and consolidating apparatus 100 includes a furnace core pipe 104 having an upper lid 102 and a heating heater 106 disposed around the furnace core pipe 104.

The heating and consolidating apparatus 100 includes a support rod 108 that holds the glass fine particle deposit M at a lower end thereof and inserts the glass fine particle deposit M into the furnace core pipe 104, and a lifting and lowering and rotating device 110 that lowers the glass fine particle deposit M and the support rod 108 together while rotating the glass fine particle deposit M and the support rod 108 together.

The heating and consolidating apparatus 100 includes a gas introduction pipe 112 for supplying an oxygen-containing gas or a He gas at a lower end of the furnace core pipe 104, and a discharge pipe 114 at an upper side of the furnace core pipe 104.

Next, the procedures of the method for manufacturing a glass fine particle deposit of the present embodiment, the manufactured glass fine particle deposit and the determination of whiteness thereof, and the method for manufacturing a glass preform using the glass fine particle deposit will be described.

(Depositing Step)

Glass particles are deposited by an Outside Vapor Deposition method (OVD method) to manufacture the glass fine particle deposit M. First, as shown in FIG. 1, the starting rod 11 and a portion of the support rod 10 are placed in the furnace 2 in a state where the support rod 10 is attached to the lifting and lowering and rotating device 3 and the starting rod 11 is attached to the lower end of the support rod 10.

Then, the MFC 25 supplies the raw material gas 23 obtained by vaporizing the siloxane to the burner 22 while controlling the supply amount based on the control signal transmitted from the control unit 5.

The raw material gas 23 and the oxyhydrogen gas (flame forming gas) are supplied to the burner 22, and the raw material gas 23 is oxidized in the oxyhydrogen flame to produce glass fine particles 30.

Then, the burner 22 continuously deposits the glass fine particles 30 produced in the flame onto the starting rod 11 that is rotated and lifted and lowered.

The lifting and lowering and rotating device 3 lifts and lowers and also rotates the starting rod 11 and the glass fine particle deposit M deposited on the starting rod 11 based on the control signal transmitted from the control unit 5.

The glass raw material used in the present embodiment is not particularly limited as long as it is a siloxane, but among the siloxanes, since it is industrially easily available and can be easily stored and handled, one having a cyclic structure is preferable, and among those, OMCTS is more preferable.

Here, in a case where silicon tetrachloride ($SiCl_4$) is used as the glass raw material instead of the siloxane, black glass fine particles are not generated, and therefore the oxidation heating step described later is unnecessary.

In the case where $SiCl_4$ is used as the glass raw material instead of siloxane, the deposited glass fine particle deposit M contains hydrochloric acid in the course of production, and thus becomes acidic (pH=about 3). On the other hand, in the glass fine particle deposit of the present embodiment, since not $SiCl_4$ but siloxane is used as the glass raw material in the manufacturing, hydrochloric acid is not generated in the production process, and the glass fine particle deposit becomes substantially neutral (pH=7).

$GeCl_4$ or $SiCl_4$ may be used for the deposition of the glass fine particles in a core portion, and in this case, hydrochloric acid is contained in a glass fine particle deposition layer. However, in a case where siloxane is used instead of $SiCl_4$ when depositing glass fine particles on a jacket portion on the outside of the core portion, hydrochloric acid is not contained on the surface of the glass fine particle deposit and thus becomes substantially neutral.

Although the depositing step described above has been described by taking the Outside Vapor Deposition (OVD) method as an example, the present disclosure is not limited to the OVD method. The present disclosure may be applied to a method of depositing glass from a glass raw material using a flame pyrolysis reaction like the OVD method, such as a Vapor-phase Axial Deposition (VAD) method, and a Multiburner Multilayer Deposition (MMD) method, for example.

Further, for the depositing step shown above, an aspect in which the liquid glass raw material is gasified and supplied to the burner 22 is specifically shown, but the liquid raw material may be supplied to the burner 22 without being gasified and ejected from the burner 22 in a liquid spray state.

(Determination Step)

Next, the determination step will be described.

Most of the glass fine particle deposit M prepared in the depositing step contains black glass fine particles, but some of the glass fine particle deposit M do not contain black glass fine particles and have high whiteness.

As described above, when the glass fine particle deposit M containing black glass fine particles is directly subjected to the transparentizing step, voids are generated in the obtained glass preform, and accordingly, an inconvenient phenomenon is caused. However, the glass fine particle deposit M having high whiteness can be directly subjected to the transparentizing step described below. In addition, the glass fine particle deposit M containing black glass fine particles can also be made to have high whiteness by an oxidation heating step described below, and then can be subjected to the transparentizing step described below.

However, there was no clear standard as to the whiteness of the glass fine particle deposit M which allows the glass fine particle deposit M to be subjected to the transparentizing step described below.

Therefore, as a result of intensive studies, the present inventors have found that in a case where a color difference $\Delta E^*ab$ with respect to a white calibration plate when the surface of the glass fine particle deposit M is measured by the SCI method using a spectrocolorimeter is 0.5 or more and less than 5, voids are less likely to be generated in the obtained glass preform even when subjected to the transparentizing step described below, and the result is used as a criterion in the determination step.

That is, in the determination step, it is determined whether the color difference $\Delta E^*ab$ with respect to the white calibration plate is 5 or more, and in a case where the color difference $\Delta E^*ab$ is 5 or more, as will be described later, the transparentizing step is performed after performing heating in an oxygen-containing atmosphere at a temperature lower than that in the transparentizing step, and in a case where the color difference $\Delta E^*ab$ is less than 5, the transparentizing step is performed without performing the heating in the oxygen-containing atmosphere.

Here, the color difference $\Delta E^*ab$ used as a reference value in the determination step may be 3 or less. When the color difference $\Delta E^*ab$ is 3 or less, voids can be made less likely to be generated.

(Oxidation Heating Step)

In a case where the color difference $\Delta E^*ab$ of the glass fine particle deposit M prepared in the depositing step is 5 or more, the glass fine particle deposit M is heated in an oxygen-containing atmosphere.

As shown in FIG. 2, with an upper end of the starting rod 11 being fixed to a lower portion of the support rod 108, the glass fine particle deposit M is suspended and supported by the lifting and lowering and rotating device 110 so as to be movable in a vertical direction, and is put into the heating and consolidating apparatus 100.

In this oxidation heating step, the oxygen-containing gas is supplied from the gas introduction pipe 112 of the apparatus 100 at an appropriate flow rate such that the oxygen content in the furnace core pipe 104 is appropriate.

At this time, the oxygen-containing atmosphere is preferably an atmosphere having an oxygen content of 10 vol % or more, and more preferably, an atmosphere having an oxygen content of 20 vol % or more and 100 vol % or less. A specific and preferable example of the atmosphere having an oxygen content of 10 vol % or more is an air atmosphere. Since air does not contain an unnecessarily large amount of oxygen, it does not cause explosive combustion due to heating or ignition, and thus, is easy to handle and is also advantageous in terms of cost.

The apparatus for performing the oxidation heating step may be the same as the apparatus for performing the transparentizing step to be described below, or the oxidation heating step and the transparentizing step described below may be performed using different apparatuses.

However, in the apparatus 100 for performing the oxidation heating step, for the material of the furnace core pipe 104, it is necessary to use a material other than carbon, such as quartz and ceramics. When the material of the furnace core pipe 104 is carbon, the furnace core pipe 104 itself will be burned and damaged.

Further, in a case where the oxygen-containing atmosphere is the air atmosphere, the apparatus 100 may not be provided with the gas introduction pipe 112 and the discharge pipe 114, and instead employ a structure in which a portion of the furnace core pipe 104 is open. However, in this case, the apparatus 100 cannot be used in the transparentizing step described below.

In the oxidation heating step, the heating temperature of the glass fine particle deposit M in the oxygen-containing atmosphere is not particularly limited as long as the heating temperature is lower than that in the transparentizing step described below and is a temperature at which oxidation of the black glass fine particles is achieved. Specifically, the temperature is preferably 500° C. or higher and 1100° C. or lower, more preferably 600° C. or higher and 1100° C. or lower, and further more preferably 700° C. or higher and 1100° C. or lower.

When the temperature is 1100° C. or lower, the glass fine particle deposit M is not vitrified, and when the temperature is 500° C. or higher, the black glass fine particles are sufficiently oxidized, which are preferable.

The heating time is not particularly limited as long as oxidation of the black glass fine particles is achieved. The heating time needs to be appropriately set according to the heating temperature and sizes of the glass fine particle deposit M and the furnace core pipe 104.

Generally, when the heating temperature is high, the heating time can be shortened, and when the heating temperature is low, the heating time needs to be lengthened. Further, when the sizes of the glass fine particle deposit M and the furnace core pipe 104 are large, it is necessary to raise the temperature or lengthen the time, and when the sizes are small, the temperature can be lowered or the time can be shortened.

Specifically, when the temperature is in the range described above, the heating time is preferably in the range of 1 hour or more and 8 hours or less, more preferably in the range of 2 hours or more and 7 hours or less, and still more preferably in the range of 3 hours or more and 6 hours or less.

When the heating time is 8 hours or less, the manufacturing time is not too long and the productivity is not reduced, which is preferable. When the heating time is 1 hour or more, the black glass fine particles are sufficiently oxidized, which is preferable.

By the above steps, the glass fine particle deposit M having a color difference $\Delta E^*ab$ of 5 or more can be made to have a color difference $\Delta E^*ab$ of less than 5.

(Transparentizing Step)

The glass fine particle deposit M prepared in the depositing step and having the color difference $\Delta E^*ab$ of less than 5 and the glass fine particle deposit M having the color difference ΔE*ab of less than 5 as a result of the oxidation heating step are heated at a temperature higher than that in the oxidation heating step such that the deposit is made transparent by dehydration and consolidation.

Similar to the oxidation heating step described above, as shown in FIG. 2, with the upper end of the starting rod 11 being fixed to the lower portion of the support rod 108, the glass fine particle deposit M is suspended and supported by the lifting and lowering and rotating device 110 so as to be movable in the vertical direction, and is put into the apparatus 100.

When the same apparatus as that for performing the oxidation heating step described above is used as the apparatus for performing the transparentizing step, after completion of the oxidation heating step, the process proceeds directly to the transparentizing step.

In the apparatus 100, for example, a mixed gas of chlorine gas ($Cl_2$) and helium gas (He) is introduced into the furnace core pipe 104 from the gas introduction pipe 112. The temperature inside the furnace core pipe 104 is maintained in a temperature range of, for example, 1000° C. or higher and 1350° C. or lower (preferably 1100° C. or higher and 1250° C. or lower), and the glass fine particle deposit M is moved downward at a predetermined speed. When the glass fine particle deposit M reaches the final lower end position, the dehydration process ends.

Then, the glass fine particle deposit M is pulled upward and returned to the start position. While increasing the temperature in the furnace core pipe to, for example, 1400° C. or higher and 1600° C. or lower, the chlorine gas ($Cl_2$) and helium gas (He) in a specific ratio or only helium gas (He), for example, is concurrently introduced from the gas introduction pipe 112. The glass fine particle deposit M is again moved downward at a predetermined speed, and when it reaches the final lower end position, the transparentization of the glass is completed and the glass preform is obtained.

(Effect)

Since the glass fine particle deposit M of the embodiment described above has a specific whiteness, it is presumed that the amount of black glass fine particles is extremely small. In addition, voids presumed to be derived from the black glass fine particles can be made less likely to be generated in the glass preform obtained in the later transparentizing step.

Further, in the method according to the embodiment described above, by providing the step of determining the glass fine particle deposit M prepared in the depositing step, it is possible to easily determine whether there is a problem even when the glass fine particle deposit M is directly subjected to the transparentizing step. Even in a case where it is determined that the glass fine particle deposit M cannot be allowed to be directly subjected to the later transparentizing step, the glass fine particle deposit M can be whitened by the oxidation heating step. It is presumed that this is because the black glass fine particles are oxidized by the oxidation heating step.

EXAMPLE

Hereinafter, the results of evaluation tests using examples according to the present disclosure and comparative examples will be shown, and the present disclosure will be described in more detail. Note that the present disclosure is not limited to these examples.

(Admissibility of Whiteness of Glass Fine Particle Deposit)

Glass fine particles were deposited, that is, the glass fine particle deposit M was manufactured by the OVD method using the manufacturing apparatus 1 shown in FIG. 1 (Depositing step).

Pure quartz glass was used as the starting rod 11.

The starting rod 11 and the burner 22 for producing glass fine particles were disposed in the furnace 2, and OMCTS in a gaseous state was introduced into the burner 22 as a glass raw material. The OMCTS was oxidized in the flame formed by the burner 22 to produce the glass fine particles 30, and the produced glass fine particles 30 were deposited on the starting rod 11 to prepare a glass fine particle deposit M.

At this time, a plurality of glass fine particle deposits M were prepared by appropriately adjusting the supply amounts of OMCTS gas and flame forming gas to the burner 22.

The surface of each of the prepared glass fine particle deposits M was measured by the SCI method using a spectrophotometer (CM-700d, manufactured by Konica Minolta, Inc.), and a color difference ΔE*ab with respect to a white calibration plate was observed, and the glass fine particle deposits M having ΔE*ab of 3.0, 4.0, 4.8, 5.2, 6.0, and 7.0 were selected.

In addition, 1 g of the glass fine particles on the surface were weighed, stirred with 10 ml of water for 1 hour, and then filtered, and a pH of the filtrate was measured by a glass electrode method (device name: pH meter F-52 manufactured by Horiba, Ltd.). The pH was measured with respect to 4% dispersion (weight %) in accordance with ISO-787-9. As a result, the pH was 5.8. In this case, the pH was not 7 (neutral), but it is considered that $CO_2$ and the like were dissolved and thus the pH was slightly acidic.

Next, using the apparatus 100 shown in FIG. 2, the selected deposit M was heated to perform transparent vitrification (transparentizing step).

The selected glass fine particle deposit M was heated, He gas and chlorine gas were introduced from the gas introduction pipe 112 of the apparatus 100, and after being heated to 1100° C., while supplying He gas from the gas introduction pipe 112 of the apparatus 100, the furnace core pipe 104 was heated with the heating heater 106 so that the inner temperature thereof was 1550° C., thereby achieving transparentization.

The glass preform manufactured by the operation described above was evaluated for the presence or absence of voids, and the results are shown in Table 1 below.

In the evaluation of voids, halogen lamp light was irradiated from the side surface of the glass preform, the inside of the glass preform was visually observed, the number of voids having a size of 1 mm or more was measured, and the evaluation was performed by the number of voids contained in the glass preform per 100 km of the converted length when drawn.

In Table 1 below, Nos. 1 to 3 are the results of examples, and Nos. 4 to 6 are the results of comparative examples.

TABLE 1

| No. | ΔE*ab of surface of glass fine particle deposit M | Amount of voids generated in glass preform (number/ 100 km converted length) |
| --- | --- | --- |
| 1 | 3.0 | 2 |
| 2 | 4.0 | 3 |
| 3 | 4.8 | 5 |
| 4 | 5.2 | 26 |

TABLE 1-continued

| No. | ΔE*ab of surface of glass fine particle deposit M | Amount of voids generated in glass preform (number/100 km converted length) |
|---|---|---|
| 5 | 6.0 | 31 |
| 6 | 7.0 | 44 |

According to Nos. 1 to 3 in Table 1 described above, when a ΔE*ab value was less than 5, the amount of voids generated in the obtained glass preform was small even when the transparentizing step was performed directly to the glass fine particle deposits M. When the ΔE*ab value was 3 or less, the amount of voids generated in the obtained glass preform was further small. On the other hand, in the cases of Nos. 4 to 6 in which the ΔE*ab value was 5 or more, when the transparentizing step was performed directed to the glass fine particle deposits M, the amount of voids generated in the obtained glass preform was increased, and as the ΔE*ab value was increased, the amount of voids generated was increased.

(Oxidation Heating Step of Deposit M Having ΔE*ab Value of 5 or More)

The deposit M having a ΔE*ab value of 5 or more was heated in an oxygen-containing atmosphere (air atmosphere) at a temperature lower than that in the transparentizing step using the apparatus 100 shown in FIG. 2 (oxidation heating step).

Specifically, the deposit M having a ΔE*ab value of 6.0 was attached to the apparatus 100, and the inside of the furnace core pipe 104 was heated to a predetermined temperature by the heating heater 106 while supplying air from the gas introduction pipe 112 at a flow rate of 10 slm (flow rate per minute at 0° C. and 1 atm), and the heating was continued for 1 hour.

For the glass fine particle deposit M having a ΔE*ab value of 6, six specimens were prepared under the same conditions and each was attached to one apparatus 100, and in each apparatus 100, the temperature in the furnace core pipe 104 was heated to 500° C., 600° C., 700° C., 800° C., and 900° C., respectively. Note that, one of the six specimens was not subjected to oxidation heating. ΔE*ab of the glass fine particle deposit M after the oxidation heating at each temperature was observed. The results are shown in Table 2 below.

Further, the same transparentizing step as described above was performed in the same apparatus.

The manufactured glass preforms were evaluated for the presence or absence of voids in the same manner as described above, and the results were as shown in Table 2 below.

In Table 2 below, Nos. 11 to 15 are the results of examples, and No. 16 is the result of a comparative example.

TABLE 2

| No. | Heating temperature in oxidation heating step (° C.) | ΔE*ab of surface of glass fine particle deposit M after oxidation heating step | Amount of voids generated in glass preform (number/100 km converted length) |
|---|---|---|---|
| 11 | 500 | 4.1 | 4.3 |
| 12 | 600 | 3.4 | 3.1 |
| 13 | 700 | 2.1 | 1.8 |
| 14 | 800 | 1.2 | 1.2 |
| 15 | 900 | 0.5 | 0.5 |
| 16 | No heating | 6.0 | 31 |

From Nos. 11 to 15 in Table 1 described above, as the heating temperature in the oxidation heating step was increased, the ΔE*ab value of the surface of the glass fine particle deposit M after the oxidation heating step was reduced, and the amount of voids generated in the obtained glass preform was also reduced. On the other hand, with respect to No. 16 in which the oxidation heating step was not performed, the ΔE*ab value of the surface of the glass fine particle deposit M was large, and voids were generated in the glass preform.

Although the present invention are described in detail with reference to the specific embodiment, it will be apparent to those skilled in the art that various changes and modifications can be made without departing from the spirit and scope of the present invention. The numbers, positions, shapes, and the like of components described above are not limited to the embodiment described above and can be changed to suitable numbers, positions, shapes, and the like on a premise that the present invention is achieved.

REFERENCE SIGNS LIST

1: Deposit manufacturing apparatus
2: Furnace
3: Lifting and lowering and rotating device
5: Control unit
10: Support rod
11: Starting rod
12: Discharge pipe
21: Raw material supply device
22: Burner
23: Raw material gas
23A: Liquid raw material
24: Vaporization container
25: MFC
26: Supply pipe
27: Temperature control booth
28: Tape heater
30: Glass fine particles
100: Heating and consolidating apparatus
102: Upper lid
104: Furnace core pipe
106: Heating heater
108: Support rod
110: Lifting and lowering and rotating device
112: Gas introduction pipe
114: Discharge pipe
M: Glass fine particle deposit

The invention claimed is:

1. A method for manufacturing a glass preform, the method comprising:
   manufacturing a transparent glass preform by heating, at a first temperature, a glass fine particle deposit in which a pH of glass fine particles on a surface of the glass fine particle deposit is 5.5 or more and less than 8.5; and
   measuring the glass fine particle surface of the deposit by a SCI (Specular Component Include) method using a spectrophotometer and determining whether a color difference ΔE*ab with respect to a white calibration plate is 5 or more,
   wherein in a case where the color difference ΔE*ab is determined to be 5 or more, the glass fine particle deposit is heated in an oxygen-containing atmosphere having an oxygen content of 10 vol % or more at a second temperature lower than the first temperature, and then the heating of the glass fine particle deposit at the first temperature is performed, and wherein in a case where the color difference ΔE*ab is determined to be less than 5, the heating of the glass fine particle deposit at the first temperature is performed without heating the glass fine particle deposit in the oxygen-containing atmosphere.

2. The method for manufacturing a glass preform according to claim 1,
wherein the second temperature is in a range of 500° C. or higher and 1100° C. or lower.

3. The method for manufacturing a glass preform according to claim 1,
wherein a heating time in the oxygen-containing atmosphere is in a range of 1 hour or more and 8 hours or less.

4. The method for manufacturing a glass preform according to claim 1,
wherein an oxygen content in the oxygen-containing atmosphere is in a range of 20 vol % or more and 100 vol % or less.

5. The method for manufacturing a glass preform according to claim 4,
wherein the oxygen-containing atmosphere is an air atmosphere.

\* \* \* \* \*